US008315945B1

(12) United States Patent
Gupta

(10) Patent No.: US 8,315,945 B1
(45) Date of Patent: Nov. 20, 2012

(54) TRANSFERRING MONEY USING A MOBILE ELECTRONIC DEVICE

(75) Inventor: Vikas Gupta, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/244,778

(22) Filed: Sep. 26, 2011

Related U.S. Application Data

(63) Continuation of application No. 13/080,483, filed on Apr. 5, 2011.

(51) Int. Cl.
*G06Q 40/00* (2012.01)
(52) U.S. Cl. .......................................................... 705/39
(58) Field of Classification Search ...................... 705/39
See application file for complete search history.

(56) References Cited

U.S. PATENT DOCUMENTS

| 7,778,457 | B2 * | 8/2010 | Nepomniachtchi et al. .. 382/137 |
| 2010/0198733 | A1 * | 8/2010 | Gantman et al. ................. 705/75 |
| 2011/0106675 | A1 * | 5/2011 | Perlman .......................... 705/30 |

OTHER PUBLICATIONS

Adams, John., "Mitek's Photo Finish for Mobile Payments," Bank Technology News, American Banker and Source Media, Oct. 2010, retrieved from http://www.americanbanker.com/bulletins/-1027227-1.html.

\* cited by examiner

*Primary Examiner* — Jessica Lemieux
(74) *Attorney, Agent, or Firm* — Johnson, Marcou & Isaacs, LLC

(57) ABSTRACT

A check service provider enables users to make and receive payments from a financial account via a mobile electronic device, such as a smartphone or tablet computer. The device includes a check module and a camera. A user can capture an image of a check using the camera and the check module deciphers information, such as an account number, bank routing number, and information regarding the account holder, from the image of the check. The user can then make payments from and receive payments into the financial account associated with the imaged check via the check module without having the physically write or deposit a check. The check service provider interacts with the ACH to settle payments directly between the user's accounts without handling the money. Users can be notified of pending payments via text, voice, and e-mail messaging.

12 Claims, 3 Drawing Sheets

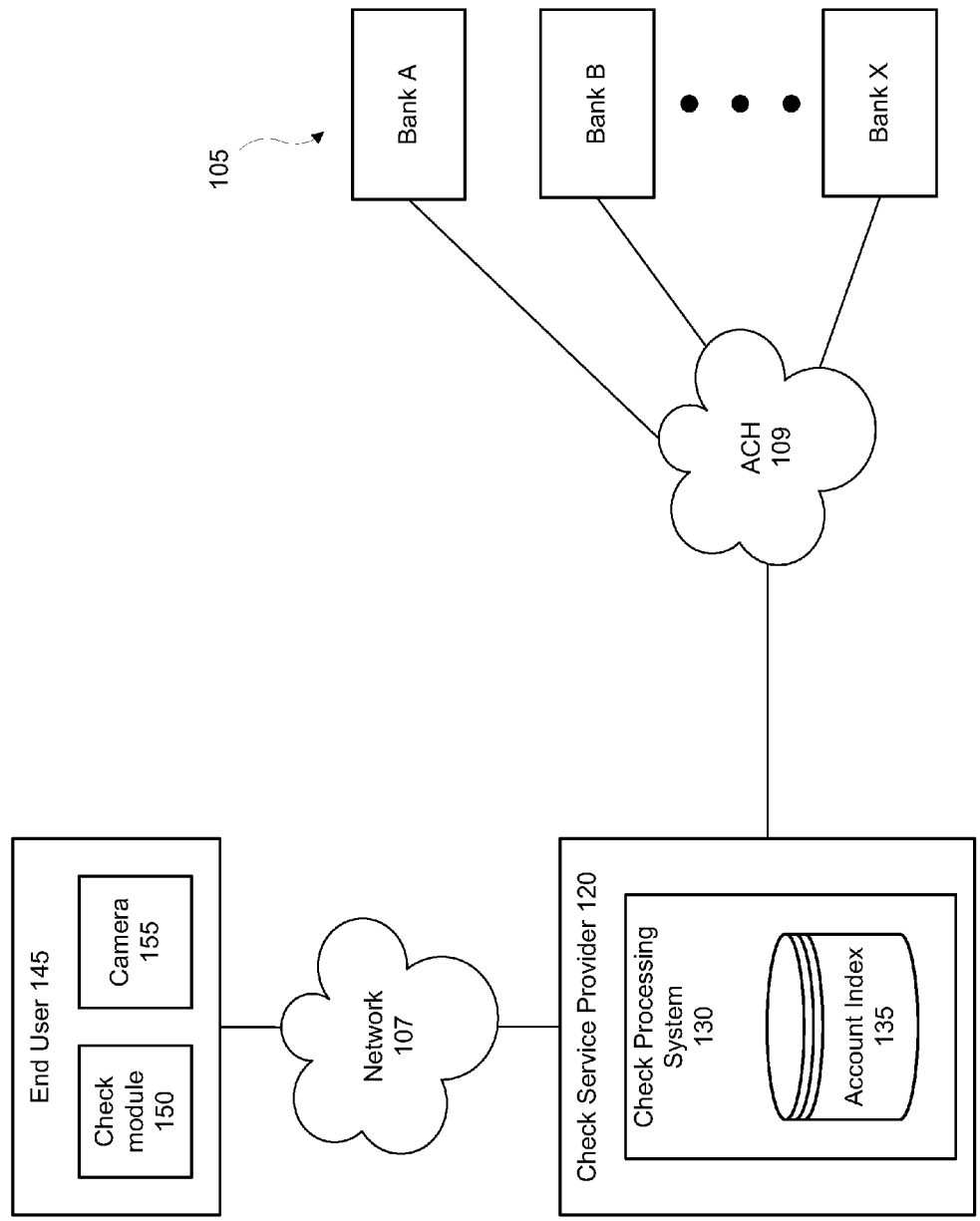

TRANSFERRING MONEY USING A MOBILE ELECTRONIC DEVICE

RELATED APPLICATION

This patent application is a continuation of and claims priority to U.S. patent application Ser. No. 13/080,483, entitled "Transferring Money Using A Mobile Electronic Device" and filed Apr. 5, 2011. The complete disclosure of the above-identified application is hereby fully incorporated herein by reference.

TECHNICAL FIELD

The present disclosure relates generally to mechanisms for transferring money and, more specifically, to sending and receiving money using a mobile electronic device and checking account information obtained from an image of a check.

BACKGROUND

A check is a written order directing a financial institution to pay a specific amount of currency to a payee. Checks are a common way for individuals and businesses to complete financial transactions using funds held in a transactional account at a financial institution. However, writing checks and depositing received checks can often be inconvenient compared to other payment methods, such as debit and credit card transactions. For example, writing a check typically requires an individual to enter a date, amount, and payee for each check. Depositing a check can be a greater hassle as an individual must deliver the received check to a location of the financial institution. Furthermore, a paper check can be easily lost between the time the check is received and the time that the payee is able to deposit the check.

Despite the inconveniences of completing transactions using paper checks and the availability of other mechanisms for exchanging currency, billions of checks are written each year, totaling trillions of dollars worth of transactions. As many people prefer the use of checks to complete financial transactions, it is desirable to provide a mechanism that simplifies the process of writing checks and depositing received checks.

SUMMARY

In certain exemplary embodiments, a system for sending a payment includes an application module that receives a request to make the payment. The application module is configured to operate on a mobile device. The request includes a selection of a recipient and a payment amount. An analysis module analyzes an image of a check associated with a financial account to decipher information regarding the financial account associated with the check. A payment processor receives, from the application module, a request to initiate the payment, information regarding the recipient, and the payment amount. The payment processor initiates a transfer of funds from the financial account associated with the check to a financial account associated with the recipient in response to receiving the request to initiate the payment.

In certain exemplary embodiments, a computer-implemented method for sending a payment includes a computer receiving an image of a check from a mobile device. The image is analyzed to obtain information regarding a financial account associated with the check. A request is received to make the payment, the payment being for a recipient and including a payment amount. The computer initiates a debit of funds from the financial account associated with the check, the funds being equal to the payment amount. The funds are applied to an account associated with the recipient.

These and other aspects, objects, features, and advantages of the exemplary embodiments will become apparent to those having ordinary skill in the art upon consideration of the following detailed description of illustrated exemplary embodiments, which include the best mode of carrying out the invention as presently perceived.

BRIEF DESCRIPTION OF THE DRAWINGS

FIG. 1 depicts a system for transferring money, in accordance with certain exemplary embodiments.

DETAILED DESCRIPTION OF EXEMPLARY EMBODIMENTS

Overview

Figure 2A:
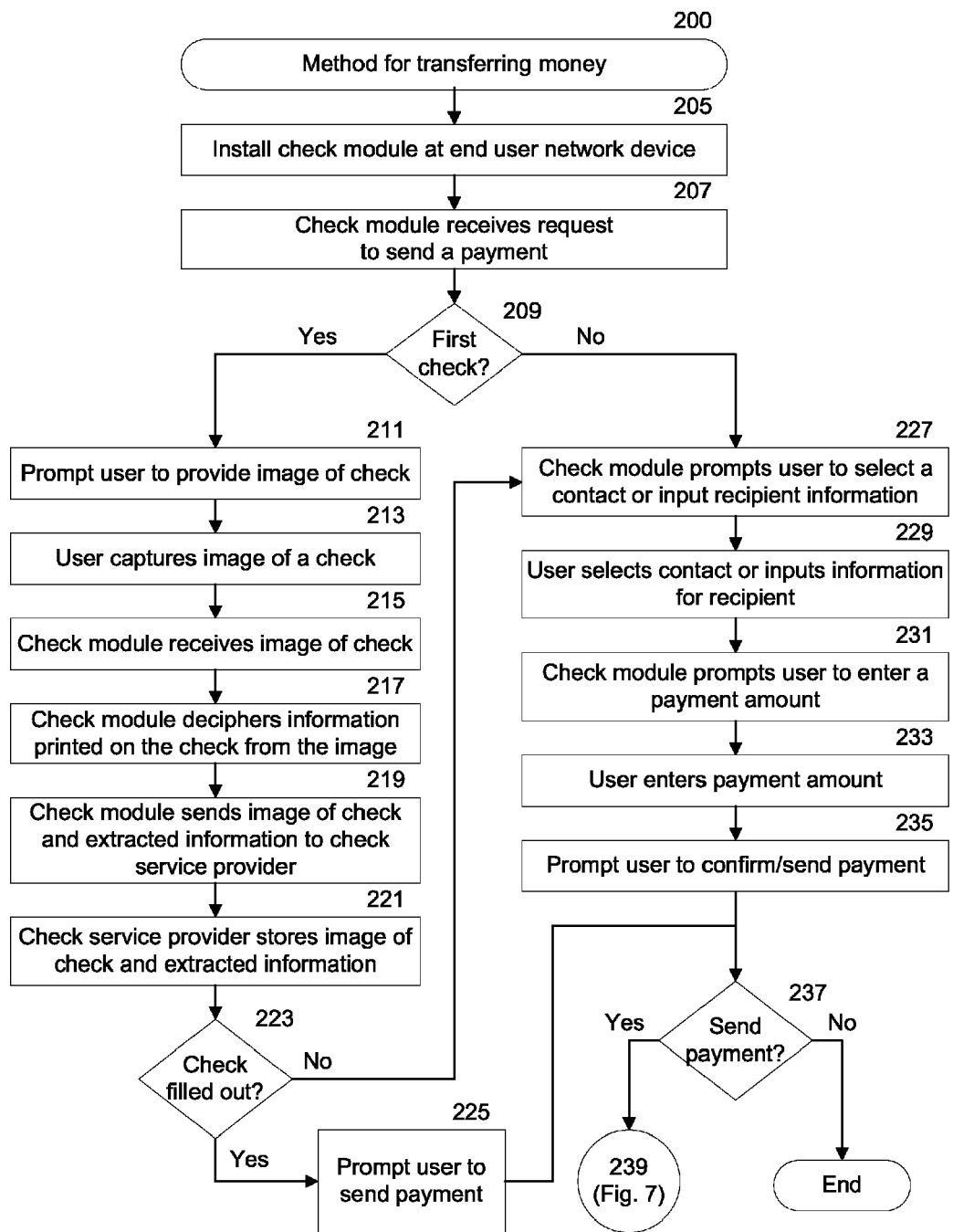
FIGS. 2A and 2B are a block flow diagram depicting a method for transferring money in accordance with certain exemplary embodiments.

The method and system described herein enable users to transfer money from one financial account to another user or make payments via mobile (or non-mobile) electronic devices, such as smartphones and tablet computers, in place of physically writing a check. A user can install a check module or software application on their electronic device and set up an account with a check service provider quickly and easily. In one embodiment, the user can capture an image of a paper check for a financial account using a camera installed on the electronic device. The check module can analyze the image of the check to decipher information printed on the paper check, such as an account number, a bank routing number, a bank name, a bank address, and information associated with the account holder, such as the account holder's name, address, and phone number. The check module sends the deciphered information and the image of the check to a check service provider for verification of the financial account and for use in settling payments sent and received by the account holder. By storing an image of the check, the check service provider does not require any additional account verification process, such as depositing a small amount of money into the account, which is required by other payment services. Although the exemplary method and system described herein employs an image of a check, an image of a deposit slip or of a withdrawal slip also may be used in certain exemplary embodiments. Once the account is created, the user can use the check module to quickly and easily send payments to other users using money from the financial account associated with the check, receive payments from other users, transfer money from the financial account associated with the check to their account with the check service provider, transfer money from their account with the check service provider to the financial account associated with the check, and make purchases using the account with the check service provider, for example from an Internet merchant.

To transfer money to another individual, business or other entity, or even to another account of the user, the user can enter into a user interface of the check module a payment amount and select a contact stored on the communication device or enter contact information for the recipient. After entering the information, the user can select to send the money to the recipient. In response, the check module sends information regarding the recipient and the payment amount to the check service provider. The check service provider sends a message to the recipient informing the recipient of the payment. If the recipient has a check module installed on their communication device and an account with the check service provider, the recipient can accept the payment via the check module. In response, the check service provider sends a message to the Automated Clearing House ("ACH") with information regarding the payment and the ACH settles the transfer of money from the user's financial account to the recipient's financial account. If the recipient does not have a check module installed on their communication device, the recipient is given the opportunity to install the check module and create an account with the check service provider to receive the money. If the recipient declines, the payment may be settled another way or cancelled.

One or more aspects of the invention may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. Further, those skilled in the art will appreciate that one or more aspects of the invention described herein may be performed by hardware, software, or a combination thereof, as may be embodied in one or more computing system. Moreover, any reference to an act being performed by a computer should not be construed as being performed by a single computer as the act may be performed by more than one computer. The inventive functionality of the invention will be explained in more detail in the following description, read in conjunction with the figures illustrating the program flow.

Turning now to the drawings, in which like numerals indicate like elements throughout the figures, exemplary embodiments of the invention are described in detail.

System Architecture

FIG. 1 depicts a system 100 for transferring money, in accordance with certain exemplary embodiments. As depicted in FIG. 1, the system 100 includes network devices 105, 120, and 145. The network devices 105, 120, 145 are operated by banks, a check service provider, and end users, respectively. The end users may include individuals, businesses, or other entities, including churches, charitable organizations, or any other entity that sends or receives checks. Although banks are illustrated in FIG. 1, other financial institutions may also be included in the system 100, such as credit unions, trusts companies, and brokers, to name a few.

The check service provider network device 120 and the end user network devices 145 are configured to communicate with one another via one or more networks 107. Each network 107 includes a wired or wireless telecommunication means by which network devices (including devices 105, 120) can exchange data. For example, each network 107 can include a local area network ("LAN"), a wide area network ("WAN"), an intranet, an Internet, a mobile telephone network, or any combination thereof. Throughout the discussion of exemplary embodiments, it should be understood that the terms "data" and "information" are used interchangeably herein to refer to text, images, audio, video, or any other form of information that can exist in a computer-based environment.

Although not shown in FIG. 1, the bank network devices 105 also can communicate with the network devices 120, 145 via the networks 107.

Each network device 105, 120, 145 includes a device capable of transmitting and receiving data over the network 107, such as one or more computers. For example, each network device 105, 120, 145 can include a server, desktop computer, laptop computer, smartphone, handheld computer, personal digital assistant ("PDA"), tablet computer, or any other wired or wireless, processor-driven device.

The check service provider network device 120 and the bank network devices 105 are further configured to communicate with an ACH network 109 to settle financial transactions. The ACH network is an electronic network for financial transactions in the United States. Thus, in certain exemplary embodiments, the ACH may be replaced or supplemented with another electronic network for financial transactions to process checks for countries other than the United States.

The end user network devices 145 each include a check module 150 for sending and receiving money via the network 107. The check module 150 may be a stand alone application or part of a digital wallet application. The check module 150 can include user interfaces that allow a user to manage their account with the check service and to view account information, past or pending payment information, contacts, including payers and payees, and any other information associated with the user's account with the check service provider 120.

The end user network devices 145 also can include or be communicably coupled to a camera 155. For example, many smartphones, tablet computers, and other mobile electronic devices include a camera 155 for taking and sharing pictures. Some non-mobile devices, such as desktop computers, are configured to couple to a camera, for example via a Universal Serial Bus ("USB") port connection.

The check service provider 120 includes a check processing system 130. The check processing system 130 maintains accounts of the end users 145 in an account index 135 and processes money transfers and payments sent between the ends users 145. The check processing system 130 can maintain images of checks for user accounts, information regarding historical and pending payments and money transfers, and account balances for each user's account in the account index 135. End users can access their account with the check service provider 120 via the check module 150 to initiate payments, transfer money between their account with the check service provider 120 and a financial account, for example at a bank 105, transfer money or a pending payment to another user, accept a payment from another user, complete purchases from Internet merchants, and to view account information, past or pending payment information, contacts, including payers and payees, and any other information associated with the user's account with the check service provider 120. The check processing system 130 and the check module 150 are described in more detail hereinafter with reference to the method illustrated in FIG. 2.

System Process

Figure 2B:
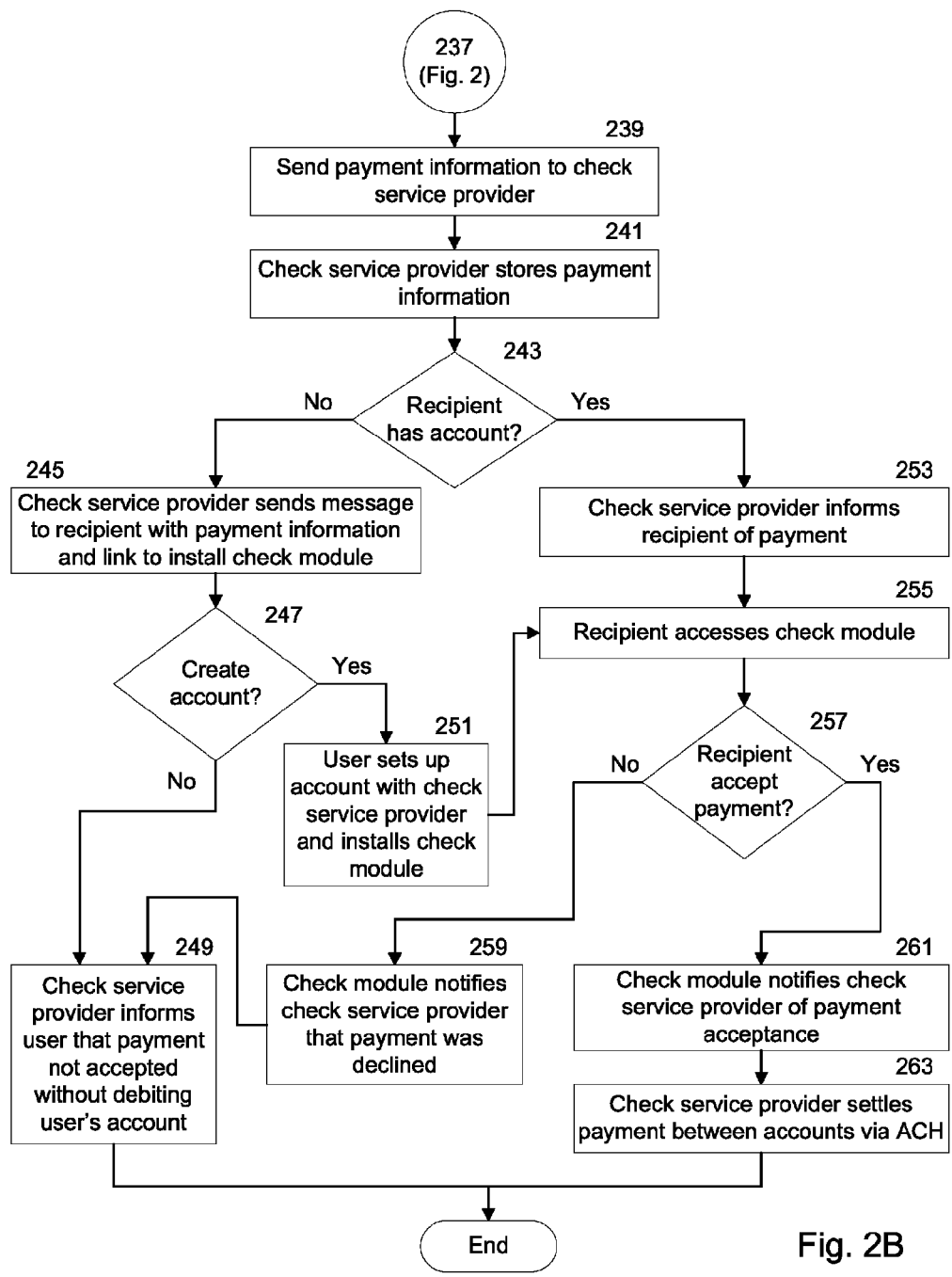

FIGS. 2A and 2B, collectively FIG. 2, are a block flow diagram depicting a method 200 for transferring money, in accordance with certain exemplary embodiments. The method 200 is described with reference to the components illustrated in FIG. 1.

In block 205, a user installs the check module 150 onto their end user mobile device 145. For example, the user may navigate to an Internet web site of the check service provider 120 via a web browser on the end user network device 145 and initiate the download. In another example, the user may browse for the check module 150 at an application store and download the check module 150 from the application store. In yet another example, the user may install the check module 150 onto the end user network device 145 via a memory device, such as a compact disc ("CD") or a USB flash drive.

In block 207, the user requests to send a payment via the check module 150. For example, the user may select a button or icon labeled "Send a check" via a user interface of the check module 150. In block 209, the check module 150 conducts an inquiry to determine whether the user has previously sent a payment via the check module 150, and thus has an account with the check service provider 120. If the check module 150 determines that the user has not previously sent a payment via the check module 150, the method 200 follows the "Yes" branch to block 211 where the check module 150 guides the user through a process for creating an account with the check service provider 120. If the check module 150 determines that the user has previously sent a check via the check module 150, the method 200 follows the "No" branch to block 227 to allow the user to send another check as the user has previously created an account with the check service provider 120.

In block 211, the check module 150 prompts the user to provide an image of a check for a financial account from which the user wants to make a payment from. In certain exemplary embodiments, the check module 150 automatically activates the camera 155 installed on the end user network device 145 and displays the target of the camera via the check module's user interface without switching to another application for the camera 155.

In block 213, the user captures an image of a check. In one example, the user captures an image of a paper check for the financial account using the camera 155. In another example, if the end user network device 145 does not include a camera, the user may capture an image of a paper check using another camera or a scanner. The user can transfer the image to the end user network device 145 and navigate to the image of the check using a user interface of the check module 150 to select the image.

In block 215, regardless of how the image of the check is captured, the check module 150 receives the image of the check. In block 217, the check module 150 deciphers information printed on the check from the image of the check. The information deciphered by the check module 150 can include an account number, a bank routing number, a bank name, a bank address, and information associated with the account holder, such as the account holder's name, address, and phone number. If the imaged check is filled out with a payee, payment amount, date, and/or check purpose information, the check module 150 also deciphers this information. The deciphered information is referred to hereinafter as "check information." In one embodiment, the check module 150 uses computer vision technology to decipher the check information. In another embodiment, the check module 150 uses optical character recognition ("OCR") to decipher the check information.

In block 219, the check module 150 sends the image of the check and the check information to the check service provider network device 120. In certain exemplary embodiments, the check module 150 also stores the check information and/or the image of the check at the end user network device 145. In certain exemplary embodiments, the check processing system 130 deciphers the check information from the image of the check rather than the check module 150. In such an embodiment, the check module 150 may send the image of the check to the check service provider network device 120 only.

In block 221, the check processing system 130 creates an account for the user in the account index 135 and stores the received image of the check and the check information in the account index 135. The image of the check and the check information stored in the account index 135 is associated with or otherwise linked to the user's account in the account index 135 so that the information can subsequently be used for payments made by the user and to receive payments from other users. The check processing system 130 may send a confirmation message to the check module 150 to confirm that the user's account has been created. Also, the user may scan checks for more than one financial account so that the user can make payments from or receive money at more than one financial account via the check module 150.

In certain exemplary embodiments, rather than use an image of a check to create an account with the check service provider 120, the user may create an account by providing information regarding a financial account to the check module 150, such as an account number, routing number, etc. However, the check service provider 120 may have to perform additional account verification steps, such as deposit a small amount of money into the account and have the user confirm the amount of the deposit to ensure the account is valid.

In block 223, the check module 150 may analyze the check information to determine whether the imaged check includes sufficient payment information, such as a payee and amount of payment written or printed on the check by the user. If the check module 150 determines that the imaged check includes sufficient payment information, the method 200 follows the "Yes" branch to block 225 where the check module 150 inquires whether the user wants to send the imaged check via the check module 150. That is, the check module 150 inquires whether the user wants to send a payment to the payee printed on the imaged check in the amount printed on the imaged check via the check module 150 rather than the paper check. After block 225, the method proceeds to block 237 and proceeds from block 237 based on whether the user elected to send the check.

Referring back to block 223, if the check module 150 determines that the imaged check did not include sufficient payment information, the method 200 follows the "No" branch to block 225. In block 227, the check module 150 prompts the user to select a recipient for payment. The check module 150 may display a list of contacts for the user that are stored at the end user network device 145 or at the check module 150 itself. For example, the check module 150 may access contacts of a smartphone and display a list of those contacts to the user. In another example, the check module 150 may access an e-mail application of the user's device and display a list of those contacts to the user. In yet another example, the check module 150 may access payment recipients stored in a digital wallet stored on the end user network device 145.

The check module 150 also may display a form or text entry box for the user to enter information regarding a payment recipient. In certain exemplary embodiments, the check module 150 may prompt the user to enter a multitude of information regarding the recipient, such as a name, address, phone number, and/or e-mail address or any other information associated with the recipient. In certain exemplary embodiments, the check module 150 may prompt the user to enter contact information for the recipient only. For example, the check module 150 may prompt the user to enter a phone number and/or e-mail address for the recipient only as this information may be sufficient to send the payment to the recipient.

In block 229, the user selects a contact or enters information regarding the recipient. If the user entered information regarding a recipient that was not a previous contact, the check module 150 may automatically save the recipient's information as a contact on the end user network device 145. Or, the check module 150 may prompt the user to add the recipient as a contact.

In block 231, the check module 150 prompts the user to enter an amount to pay the recipient via a user interface, such as a form, text entry box, or drop down menu. In block 233, the user enters a payment amount into the user interface and the check module 150 receives information regarding the payment amount. Although blocks 231-233 are illustrated as following blocks 227-229, the check module 150 can prompt the user for a payment amount at the same time as or before prompting the user for a contact or recipient for the check.

In block 235, the check module 150 prompts the user to confirm payment information prior to sending. For example, the check module 150 may display the recipient information and payment amount information along with an icon or button for the user to select to confirm that the information is correct. In block 237, if the user confirms the information, the method follows the "Yes" branch to block 239. Otherwise, if the user elects not to send the payment, the method 200 ends. Of course, the check module 150 may return to a user interface that allows the user to send another payment or to change the recipient or payment amount prior to sending.

In block 239, the check module 150 sends the confirmed payment information and information regarding the recipient to the check service provider 120. The information regarding the recipient typically includes a telephone number, an e-mail address, or other form of contact information for the recipient so that the check processing system 130 can inform the recipient of the payment. In block 241, the check service provider network device 120 receives and stores the payment information and the recipient information. The check processing system 130 also may update the user's account in the account index 135 to indicate the pending payment.

In block 243, the check processing system 130 conducts an inquiry to determine whether the recipient has an account with the check service provider 120. For example, the check processing system 130 may compare the contact information of the recipient to contact information for account holders in the account index 135. If the check processing system 130 determines that the recipient does not have an account with the check service provider 120, the method 200 follows the "No" branch to block 245.

In block 245, the check service provider network device 120 sends a message to the recipient to inform the recipient of the payment. This message can be in the form of a Short Message Service ("SMS") text message, a Multimedia Messaging Service ("MMS") message, or a voice message sent to a mobile telephone of the recipient obtained from the contact information provided by the check module 150 of the user. The message also can be in the form of an e-mail message to the recipient obtained from the contact information provided by the check module 150 of the user.

The message sent to the recipient can include payment amount information, information identifying the sender of the payment, and information regarding a time period for accepting the payment. As it has been determined that the recipient does not yet have an account with the check service provider 120, the message also may include information for installing the check module 150 and for setting up an account with the check service provider 120. For example, an SMS text message, MMS message, or e-mail message may include a link, such as a Uniform Resource Locator ("URL"), to a web site for downloading the check module 150. In another example, an MMS message or e-mail message may include a Quick Response ("QR") code that the user can scan using a scanner or camera 155 installed on the end user network device 145 to install the check module 150 on the end user network device 145.

At this point, the recipient has the option of creating an account with the check processing system 130 to accept the payment. The recipient may be given a certain amount of time to create the account before the check processing system 130 cancels the payment. For example, the recipient may be given three days to create an account with the check service provider 120 before the payment is cancelled. In certain exemplary embodiments, the user may be given the option to specify the time period for cancellation.

In certain exemplary embodiments, the recipient is not required to create an account with the check service provider 120. Instead, the check service provider 120 may allow the check service provider 120 to receive payment via a printed check from the check service provider 120 or to provide payment account information for a one time deposit.

If the recipient elects to create an account with the check service provider 120, the method 200 follows the "Yes" branch from block 247 to block 251. Otherwise, if the recipient elects to not create an account with the check service provider 120, the method 200 follows the "No" branch from block 247 to block 249.

In block 249, the check service provider network device 120 informs the user that the payment was not accepted by the recipient. For example, the check service provider network device 120 may send a notification to the check module 150 and the check module 150 may display a notification via an account user interface of the check module 150. In another example, the check service provider network device 120 may send an SMS text message or an e-mail to the user to notify the user that the payment was not accepted. After block 249, the method 200 ends.

In block 251, the recipient creates an account with the check service provider 120 and installs the check module 150 on a network device of the recipient. The recipient can follow a link or scan the QR code to download and install the check module 150. Once installed, the recipient can create an account in a similar manner to the way that the user created an account. That is, the recipient can capture an image of a check and the check module 150 can decipher information from the image of the check. The check module 150 can send the image of the check and the check information (from the deciphered information) to the check service provider 120. After receiving the image of the check and the check information, the check processing system 130 creates an account for the recipient in the account index 135 and stores the image of the check and the check information in the account index 135. The check service provider network device 120 can inform the recipient that an account has been created and inquire whether the recipient desires to accept the payment from the user. After block 251, the method 200 proceeds to block 255.

Referring back to block 243, if the check processing system 130 determines that the recipient has an account with the check service provider 120, the method 200 follows the "Yes" branch to block 253. In block 253, the check service provider 253 informs the recipient of the payment. As the recipient has an account with the check service provider 120, the check service provider network device 120 can inform the user via the check module 150, for example via an account summary or pending payments user interface. In addition or in the alternative, the check service provider 120 can inform the recipient via an SMS text message, MMS message, voice message, or e-mail message.

In block 255, the recipient accesses the check module 150 on their network device 145 and views the payment information. The recipient can accept the payment, decline the payment, or forward the payment to another recipient. To forward the payment, the recipient can select to forward all or a portion of the payment and select a recipient for the payment, similar to the acts of blocks 227-235. If the recipient elects to forward the payment, the check processing system 130 can update the respective accounts in the account index 135 and the check service provider network device 120 can notify the recipient(s) of the forwarded payment.

In certain exemplary embodiments, recipients having an account with the check service provider 120 may given a certain time period to accept, decline, or forward the payment. If the time period expires, the check processing system 130 may automatically accept the payment for the recipient and settle the payment between the use's financial account and the recipient's financial account.

If the recipient accepts the payment, the method 200 follows the "Yes" branch from block 257 to block 261. Otherwise, the method 200 follows the "No" branch from block 257 to block 259. In block 259, the check module 150 notifies the check service provider network device 120 that the payment was declined. After block 259, the method proceeds to block 249 where the check service provider network device 249 informs the user that the payment was declined by the recipient.

In block 261, the check module 150 notifies the check service provider network device 120 that the payment was accepted. The check service provider network device 120 also may notify the user that the payment was accepted, for example via a user interface of the check module 150 or via an SMS text message, e-mail message, or voice message.

In block 263, the check service provider network device 120 interacts with the ACH network 109 to settle the payment between the financial account of the user and the financial account of the recipient. In one embodiment, the check service provider network device 120 sends a message to the ACH network 109 that includes information regarding the payment sufficient for the ACH network 109 to debit the user's financial account and credit the recipient's financial account the payment amount. For example, this message may include information identifying the financial account of the user, information identifying the financial account of the recipient, the payment amount, and when the payment should be processed. The ACH network device 109 can interact with the banks 105 from which the user' financial account and the recipient's financial account are held.

Thus, the method 200 enables a user to transfer money directly to a recipient without a third party, such as the check service provider 120, handling the money. Instead, the check service provider 120 facilitates the transfer of money from one financial account to another financial account via the ACH network 109.

In certain exemplary embodiments, rather than transfer money directly between users' financial accounts, the check processing system 130 may debit the user's financial account and credit the recipient's financial account via ACH requests. For example, instead of waiting for the recipient to accept or decline the payment, the check processing system 130 can debit the user's financial account. If the recipient subsequently declines the payment or does not respond prior to the time period expiring, the check processing system 130 can make the debited money available in the user's account with the check service provider 120 for future use or to be withdrawn back to the user's financial account. If the recipient accepts the payment after the user's financial account has been debited, then the check processing system 130 can initiate a transfer from the check service provider 120 to the recipient via the ACH network 109.

In another example, rather than automatically applying the payment to the recipient's financial account via the ACH network 109 upon acceptance of the payment in block 263, the check processing system 130 may debit the user's financial account via the ACH network and apply the payment to the recipient's account with the check service provider 130. The recipient then has the option of transferring all or a portion of the money from the payment to another user, withdrawing the money to their financial account, making a purchase using the money from an Internet merchant, or maintaining the money in their account with the check service provider 120 indefinitely.

Although the exemplary method 200 of FIG. 2 have been discussed in terms of a user making a payment to a recipient, a similar method can be used to request a payment from another user. For example, a user can submit a payment request via the check module 150 and the check module 150 can forward the request to a payer via the check service provider 120. The payer can then accept the request and make the payment via the check module 150, or decline the payment request. A time period also may be given to a payer to accept the payment request. The check processing system 130 can automatically accept or decline the payment request if the time period expires prior to the payer making a selection. In certain exemplary embodiments, the users can opt out of automatic payments.

The method 200 also can be used to pay or request payment from multiple users at the same time. For example, the check module 150 can allow, in block 227, the user to select or enter information for multiple recipients rather than just one. Each of the multiple recipients can be paid or be requested to pay the same or different amounts.

General

The exemplary methods and blocks described in the embodiments presented previously are illustrative, and, in alternative embodiments, certain blocks can be performed in a different order, in parallel with one another, omitted entirely, and/or combined between different exemplary methods, and/or certain additional blocks can be performed, without departing from the scope and spirit of the invention. Accordingly, such alternative embodiments are included in the invention described herein.

The invention can be used with computer hardware and software that performs the methods and processing functions described above. As will be appreciated by those having ordinary skill in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Although specific embodiments of the invention have been described above in detail, the description is merely for purposes of illustration. Various modifications of, and equivalent blocks corresponding to, the disclosed aspects of the exemplary embodiments, in addition to those described above, can be made by those having ordinary skill in the art without departing from the spirit and scope of the invention defined in the following claims, the scope of which is to be accorded the broadest interpretation so as to encompass such modifications and equivalent structures.

What is claimed is:

1. A computer-implemented method for transferring money from a first financial account to a second financial account, comprising:
   - receiving, by a computer, a request to transfer money to a recipient, the request comprising information regarding the recipient and an amount of money to be transferred, the request originating from a first application module configured to operate on a mobile device;
   - receiving, by the computer, an image captured from a first paper check associated with the first financial account, the image of the first paper check originating from the first application module;
   - deciphering information regarding the first financial account from the image of the first paper check, the information being sufficient to associate the first financial account with a first transfer account managed by the computer;
   - associating, by the computer, the first financial account with the first transfer account based on the deciphered information regarding the first financial account, the first transfer account being authorized to transfer funds from the first financial account;
   - sending, by the computer, a message to a communication account of the recipient, the message comprising information regarding the request to transfer money;
   - receiving, by the computer, an image captured from a second paper check, the second paper check being associated with the second financial account, the image of the second paper check originating from a second application module configured to operate on a mobile device, wherein the second financial account is a financial account of the recipient;
   - deciphering information regarding the second financial account from the image of the second paper check, the information being sufficient to associate the second financial account with a second transfer account managed by the computer, the second transfer account being a transfer account of the recipient;
   - associating, by the computer, the second financial account with the second transfer account based on the deciphered information regarding the second financial account, the second transfer account being authorized to receive a transfer of funds from the first financial account to the second financial account; and
   - initiating, by the computer, the transfer of money from the first financial account to the second financial account.

2. The computer-implemented method of claim 1, wherein initiating the transfer of funds comprises sending an Automated Clearing House ("ACH") message to an ACH network, the ACH message comprising information identifying the first financial account associated with the first check, information identifying the second financial account associated with the recipient, and the payment amount.

3. The computer-implemented method of claim 1, wherein the message to the communication account of the recipient notifies the recipient of the request to transfer money and prompts the recipient to provide the image of the second check.

4. The computer-implemented method of claim 1, wherein the first application module deciphers the information regarding the first financial account from the image of the first check and sends the image of the first check and the information regarding the first financial account associated with the check to the computer.

5. The computer-implemented method of claim 1, wherein the second application module deciphers the information regarding the second financial account from the image of the second check and sends the image of the second check and the information regarding the second financial account to the computer.

6. The computer-implemented method of claim 1, wherein the computer performs the deciphering acts.

7. The computer-implemented method of claim 1, wherein the first application module sends the request to make the payment to the computer in response to receiving a command to make the payment, the payment amount, and a selection of the recipient from a plurality of recipients.

8. The computer-implemented method of claim 1, further comprising:
   - in response to a time period after sending the message to the communication account of the recipient, prior to the recipient accepting the transfer of money, automatically initiating the transfer of funds.

9. The computer-implemented method of claim 1, wherein the computer receives the request to make the payment, the request comprising contact information associated with the recipient, and wherein the computer notifies the recipient of the payment via the contact information.

10. The computer-implemented method of claim 1, wherein the first transfer account and the first financial account comprise the same account.

11. The computer-implemented method of claim 1, wherein the second transfer account and the second financial account comprise the same account.

12. The computer-implemented method of claim 1, further comprising deciphering, from the image of the first paper check, information written on the first paper check, the written information comprising an identification of the recipient and the amount of money to be transferred, wherein the information in the request regarding the recipient and an amount of money to be transferred is obtained from the information written on the first paper check.

* * * * *